(12) United States Patent
Gross

(10) Patent No.: US 6,850,541 B2
(45) Date of Patent: Feb. 1, 2005

(54) TECHNIQUE TO MEASURE NETWORK PATH BANDWIDTH CAPACITY USING MODAL ANALYSIS

(75) Inventor: Gerhard W. Gross, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/261,826

(22) Filed: Sep. 30, 2002

(65) Prior Publication Data

US 2004/0062207 A1 Apr. 1, 2004

(51) Int. Cl.[7] .............................. H04J 3/24; H04J 3/16; H04L 12/28; G01R 31/08; G06F 15/173
(52) U.S. Cl. ...................... 370/473; 370/468; 370/412; 370/231; 709/226; 709/229
(58) Field of Search ................................ 370/470, 472, 370/473, 474, 519, 400, 395.21, 351, 395.4, 252, 230.1, 229, 230, 231; 709/226, 229, 245, 238, 248, 223, 224

(56) References Cited

U.S. PATENT DOCUMENTS

| | | | | |
|---|---|---|---|---|
| 6,115,357 A | * | 9/2000 | Packer et al. ............... | 370/231 |
| 6,201,791 B1 | * | 3/2001 | Bournas ..................... | 370/234 |
| 6,363,429 B1 | * | 3/2002 | Ketcham .................... | 709/235 |
| 6,477,168 B1 | * | 11/2002 | Delp et al. ................ | 370/395.4 |
| 6,498,782 B1 | * | 12/2002 | Branstad et al. ............ | 370/231 |
| 6,580,694 B1 | * | 6/2003 | Baker ......................... | 370/252 |
| 6,625,122 B1 | * | 9/2003 | Joffe .......................... | 370/230 |
| 6,646,996 B1 | * | 11/2003 | Barillaud .................... | 370/254 |

OTHER PUBLICATIONS

Pub. No. U.S. 2003/0016630A1, Veg–Garcia et al., Method and System for Providing Adaptive Bandwwidth Control for Real–time Communication, Jan. 23, 2003.*
Pub. No. U.S. 2002/0097679 A1, Berenbaum, Automatic Quality of Service Assignment in Ethernet Switches, Jul. 25, 2002.*
Constantinos Dovrolis, Parameswaran Ramanathan, David Moore, "Packet Dispersion Techniques and Capacity Estimation," IEEE/ACM Transactions on Networking, Jul. 2001, pp. 1–32.

* cited by examiner

Primary Examiner—Hanh Nguyen
(74) Attorney, Agent, or Firm—Marger Johnson & McCollom

(57) ABSTRACT

The invention is a system and method to measure network bandwidth. A source computer sends sets of packet pairs to a destination computer. Each set of packet pairs is centered around a different packet size. The destination computer times each packet pair to determine the time delta between the packets in the packet pair. The time deltas are then organized and analyzed to determine the network bandwidth.

38 Claims, 10 Drawing Sheets

TECHNIQUE TO MEASURE NETWORK PATH BANDWIDTH CAPACITY USING MODAL ANALYSIS

FIELD

This invention pertains to networks, and more particularly to measuring the bandwidth of a network.

BACKGROUND

Originally, computer networks consisted of direct links between computers. When computer A wanted to talk to computer B, there was a direct physical link connecting the two machines. Measuring the bandwidth along the connection was easy: as the source computer sent out data packets, the destination computer could receive the data packets and measure the time delay between the data packets, establishing the bandwidth.

ARPA (the Advanced Research Projects Agency) began the research and development that led to the Internet of today. Instead of having each computer able to talk directly with every other computer, each computer connected to only certain other computers. To send a message to a computer that is not directly linked to a source computer, the source computer sends the message to a neighbor, and asks the neighbor to route the message. The neighbor looks at the destination of the message, and does its best to route the message to the recipient.

FIG. 1 illustrates this scenario. In FIG. 1, various devices are connected via a network. For example, server 105, personal computer 110, cellular telephone 115, and personal digital assistant (PDA) 120 are all connected to network 125. Network 125 may include any number of computers, interconnected in any configuration, thereby allowing server 105, personal computer 110, cellular telephone 115, and PDA 120 to access network 125 from different points.

FIG. 2 shows paths across the network of FIG. 1, connecting different devices. For example, path 205 connects server 105 and personal computer 110, and includes nodes 210, 215, 220, 225, 230, and 235. In contrast, another path through network 145 (connecting other devices) might be path 240, including nodes 245, 225, 250, and 255.

To measure bandwidth, one computer (such as server 105) sends out data packets, which are received by the second computer (such as personal computer 110). The second computer measures the bandwidth of the network by diving the number of bits transmitted by the difference in arrival times of the first and last packet. Arithmetically, the formula is:

$$BW = \frac{NumBits}{T_2 - T_1}.$$

But notice that node 225 is on both of paths 205 and 240. This introduces a complication not present when computers are directly connected. Now, node 225 has to route packets along both paths. Since it may only consider one packet at a time, it might take a message longer to travel on one path that it would if node 225 were only on the path connecting server 105 and personal computer 110. This delay is not a permanent limitation on the network's ability to transfer data, but rather a short-term limitation of one node along the path.

FIG. 3 illustrates this situation. In FIG. 3, packets 305 are shown entering node 225. Node 225 processes the packets in the order in which they were received. This means that some packets will be directed to node 240, others to node 230, and others to node 250 (and perhaps other packets directed to other nodes not shown in network 125). While node 225 is processing packets along path 240, it may not process packets along path 205, resulting in a delay. If the destination computer measures the delay between packets, a delay augmented by a busy node in the network, the calculated estimate for the network bandwidth is lower than the actual network bandwidth.

Another problem may arise when the first packet is queued but the last packet is not. By "squeezing" the packets closer together, the computed network bandwidth is higher than the actual network bandwidth.

To account for delay and squeezing, one approach previously taken is to use packet trains. Packet trains are simply groups of packets, typically numbering between 2 and 30. A person skilled in the art will recognize that packet trains with higher number of packets suffer from increased queueing delay relative to packet trains with smaller numbers of packets, as there are more packets that may be potentially queued. Similarly, packet trains using larger packet sizes suffer from increased queueing delay relative to packet trains using small packet sizes, as the larger packets take longer to transmit. Using packet trains allows for an estimation of bandwidth that accounts for average network queueing delay. But it does not measure the true bandwidth of the network.

A need remains for a way to measure network bandwidth that addresses these and other problems associated with the prior art.

DETAILED DESCRIPTION

Figure 4:
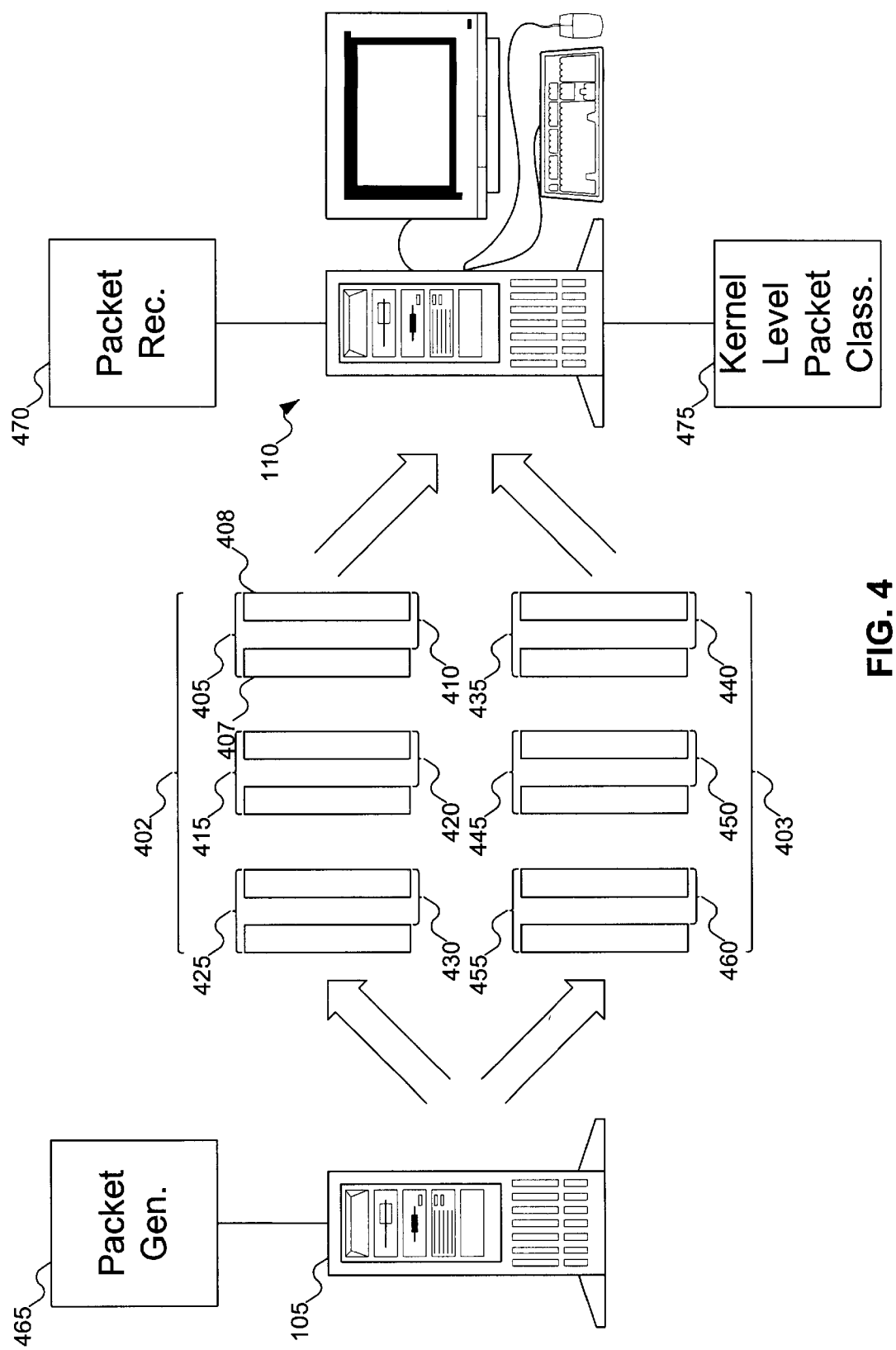
FIG. 4 shows sets of packet pairs being sent from the source computer to the destination computer across the network of FIG. 1, according to an embodiment of the invention.

To measure true network bandwidth, a new approach is presented. FIG. 4 shows sets of packet pairs being sent from the source computer to the destination computer across the network of FIG. 1, according to an embodiment of the invention. Instead of sending large packet trains, the source computer (in FIG. 4, server 105) sends out sets of packet pairs. For example, server 105 is shown sending out two sets 402 and 403 of packet pairs. Within each set, each packet pair consists of two packets. For example, packet pair 405 includes packets 407 and 408.

When each packet pair arrives at the destination computer (such as personal computer 110), there is a time delta (a difference in arrival times) between the first and second packet. For example, for packet pair 405, the time delta is time delta 410 (represented as a spatial distance rather than a time difference). Although the time delays for all packet pairs in FIG. 4 are represented as having the same spatial gap, a person skilled in the art will recognize that the time deltas for the packets may vary. For example, time delta 410 may be larger or smaller than time delta 420.

Once the time delta for each packet pair has been measured, the time deltas are "stored" in bins. That is to say, a count is kept of the number of time deltas that fall within each bin. Each bin represents a range of possible network bandwidths in one embodiment. The bins are determined ahead of time, using any desired technique. For example, based on prior performance of the network, the bins may be pre-selected so that each bin represents a two megabit per second (Mbps) range for the network bandwidth, spanning (say) 80 Mbps. Once a bin is selected as best representing the network bandwidth, the network bandwidth may be selected as the bandwidth in the middle of the bin span. This is discussed further with reference to FIG. 5 below.

Each set of packet pairs uses a different packet size. One set may use a small packet size, and the other set may use a large packet size. For example, set 402 of packet pairs may use a packet size of 96 bytes, whereas set 403 of packet pairs may use a packet size of 512 bytes. By using different packet sizes, delays attributable to packet size may be accounted for. The time deltas for the packet pairs of one set are binned separately from the time deltas for the packet pairs of the other set. The selected packet sizes are not critical, so long as packet fragmentation (breaking a packet up into smaller packets) is avoided.

To help even the spread of the time deltas across the bins in one embodiment, the sets of packet pairs may be centered around a packet size, rather than be fixed at a single packet size. This may be accomplished by selecting a number of different packet sizes, say 10, ranging across a number of bytes, say 75 bytes. For example, using 96 bytes as the center of the range of packet sizes, one set of packet pairs may be drawn from the following packet sizes: 64, 72, 80, 88, 96, 104, 112, 120, 128, and 136. Different packet sizes may be determined for the set of packet pairs centered around a larger packet size, such as 512 bytes.

To generate the packets, server 105 uses packet generator 465. To receive the packets, personal computer 110 uses packet receiver 470. And to measure the time delta between packets in a packet pair, personal computer 110 uses kernel level packet classifier 475. Packet classifier 475 is a timer capable of measuring the time a packet arrives. Then, by subtracting the time the first packet arrives from the time the second packet arrives, the time delta may be determined.

By having packet classifier 475 be a kernel level packet classifier, packet classifier 475 is capable of measuring packet arrival times as accurately as the computer allows: by using the processor cycles of the computer. This may enable up to (and beyond) nanosecond level precision. Increased precision means increased accuracy in determining network bandwidth. But a person skilled in the art will recognize that any variety of timer may be used, including one with less-than-nanosecond resolution.

Figure 5:
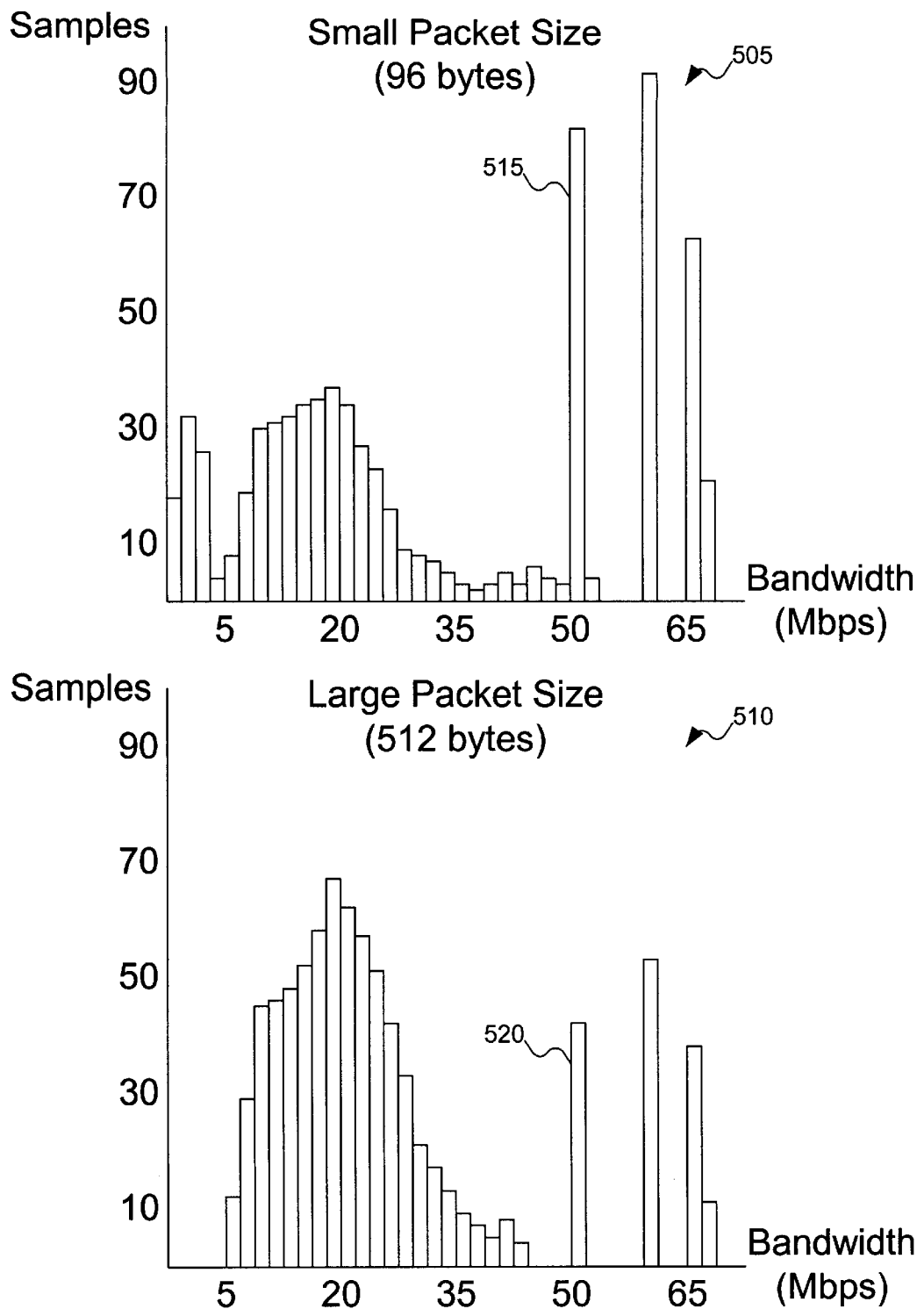
FIG. 5 shows histograms of the time deltas for the packets of FIG. 4, according to an embodiment of the invention.

FIG. 5 shows histograms of the time deltas for the packets of FIG. 4, according to an embodiment of the invention. As mentioned above with reference to FIG. 4, the time deltas are placed into bins based on the bandwidth computed from the time deltas, and separate bins are kept for the small and large packet sizes. FIG. 5 shows a possible arrangement of the bins. In FIG. 5, two graphs are shown. Graph 505 is for the set of packet pairs that range over the small packet size, and graph 510 is for the set of packet pairs that range over the large packet size.

Each bar represents a bin, into which time deltas have been accumulated. For example, bar 515 of graph 505 and bar 520 of graph 510 both represent a bin with bandwidth centered around 50 Mbps. The height of the bars (the amplitude) indicates the number of packet pairs (with each set) whose time delta fits into that bin. So, for example, there were approximately 82 packet pairs in the set of small packet pairs whose time deltas indicated a 50 Mbps bandwidth for the network.

Notice that the two distributions are similar, but not identical. For example, bar 515 of graph 505 is taller than its respective bar 520 in graph 510. This indicates that there were more time deltas from the small packet size set representing a 50 Mbps bandwidth than there were time deltas from the large packet size set representing a 50 Mbps bandwidth.

Figure 1:
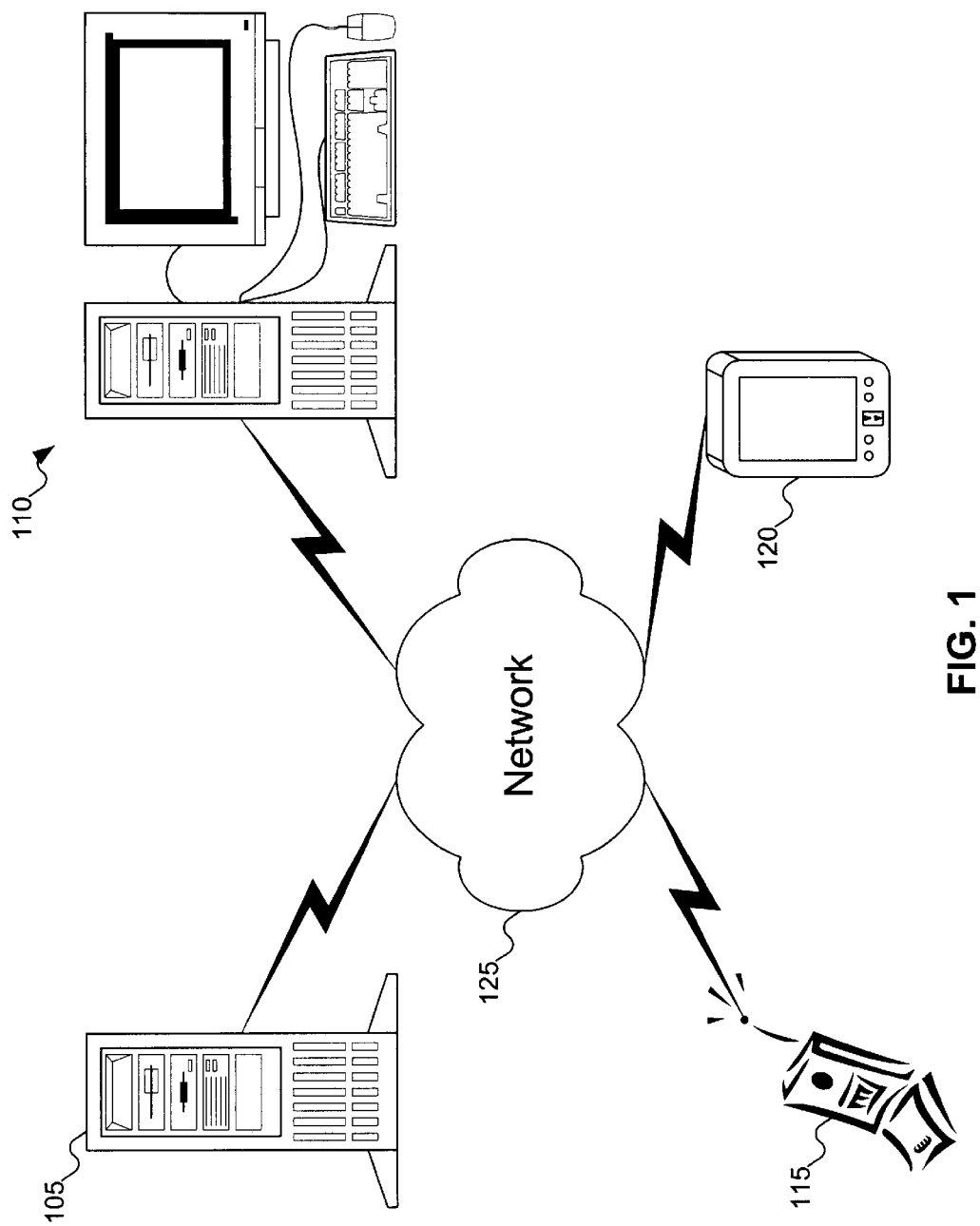
FIG. 1 shows devices communicating across a network according to the prior art.
Figure 2:
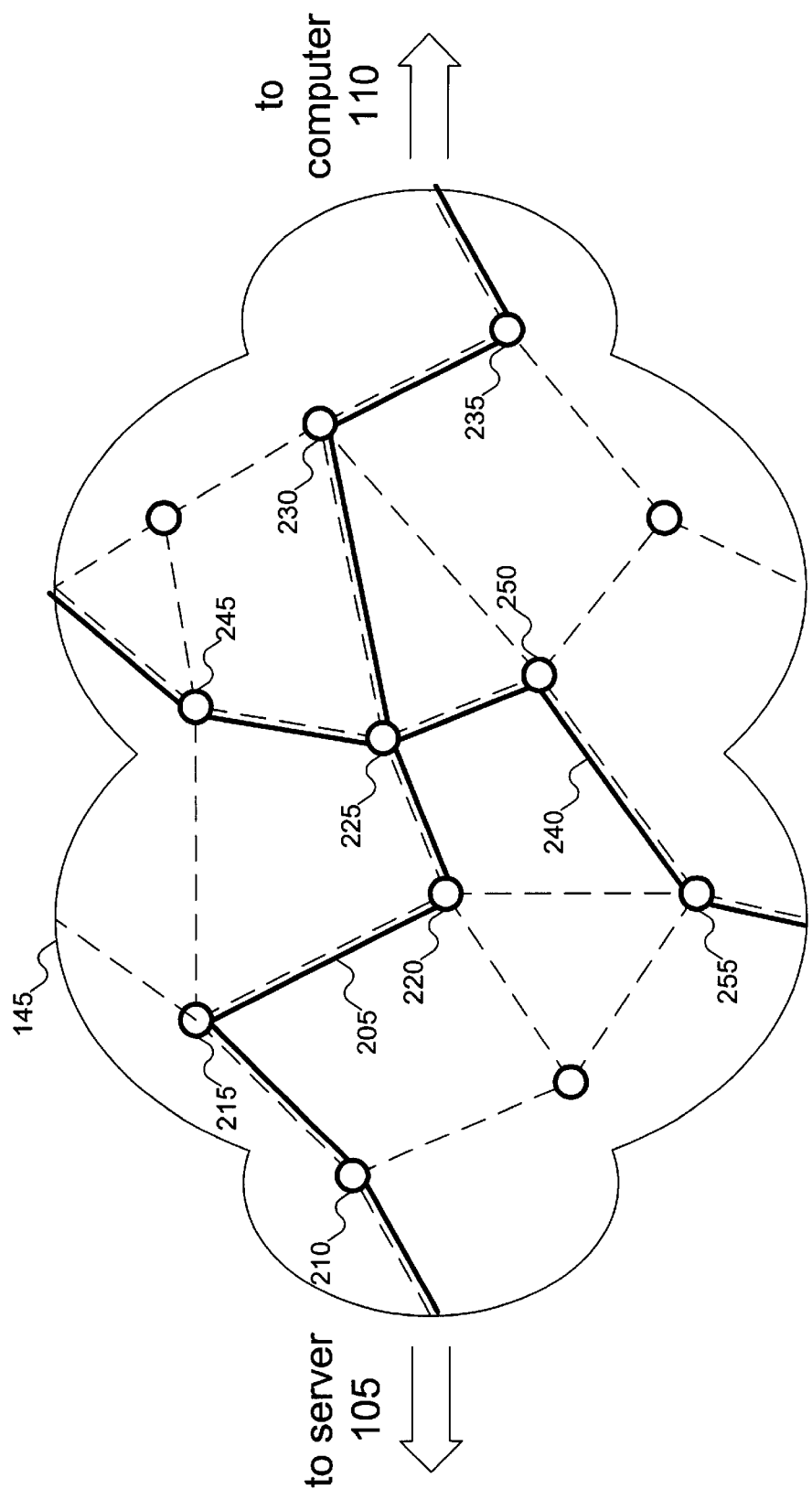
FIG. 2 shows paths across the network of FIG. 1, connecting different devices.
Figure 3:
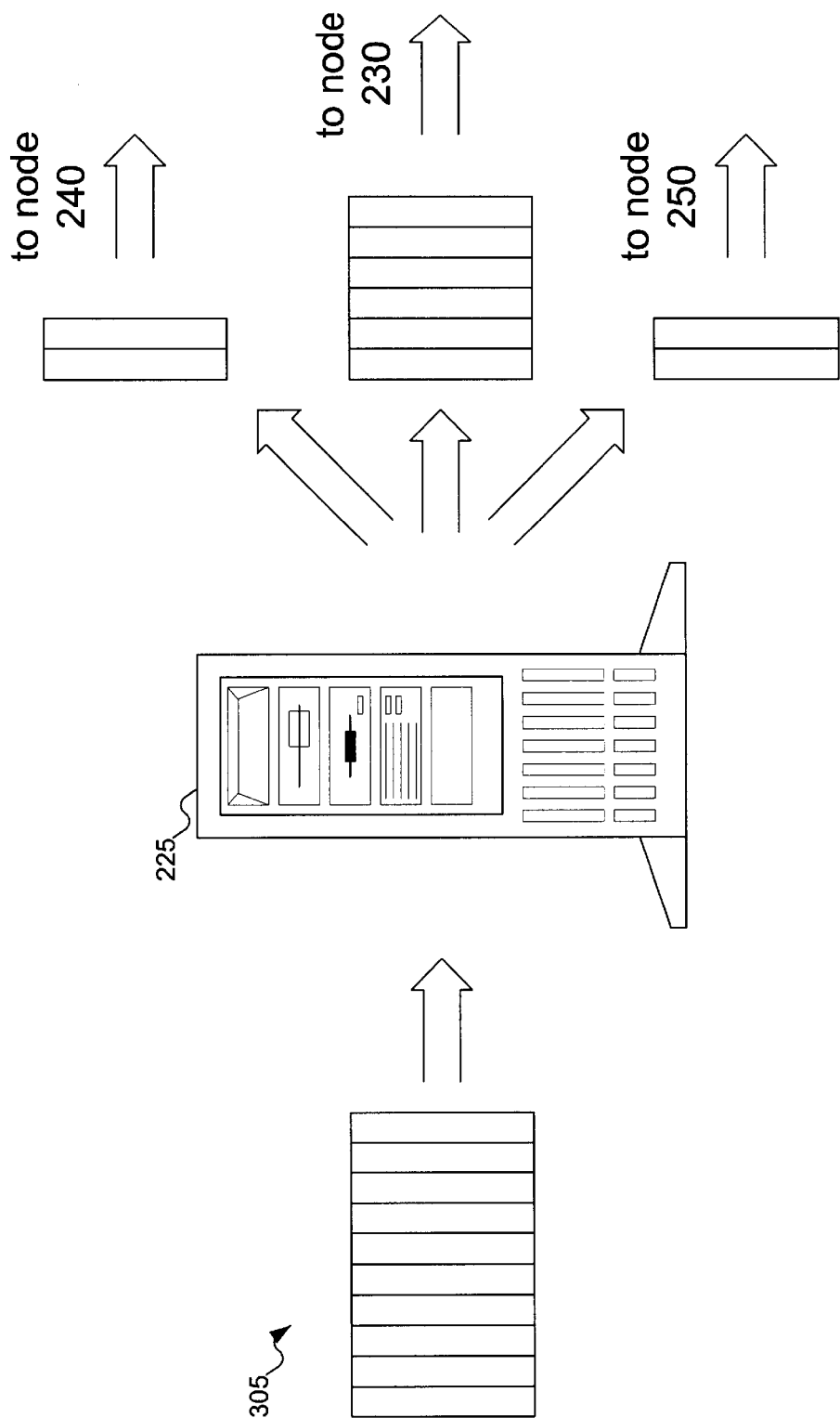
FIG. 3 shows a server on the paths of FIG. 2 routing packets to different destinations.
Figure 6A:
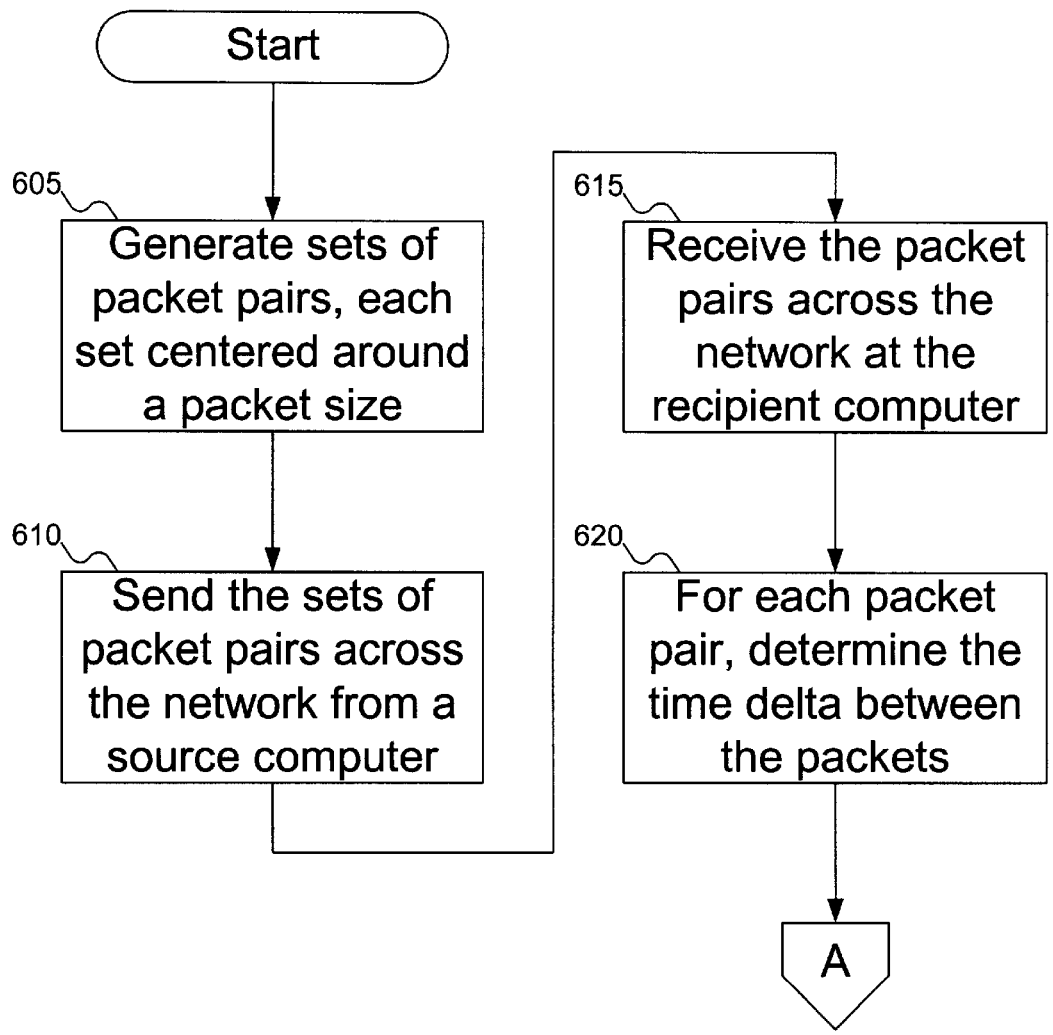
FIGS. 6A–6B show a flowchart of the procedure for using sets of packet pairs to determine the bandwidth of the network of FIG. 1, according to an embodiment of the invention.
Figure 6B:
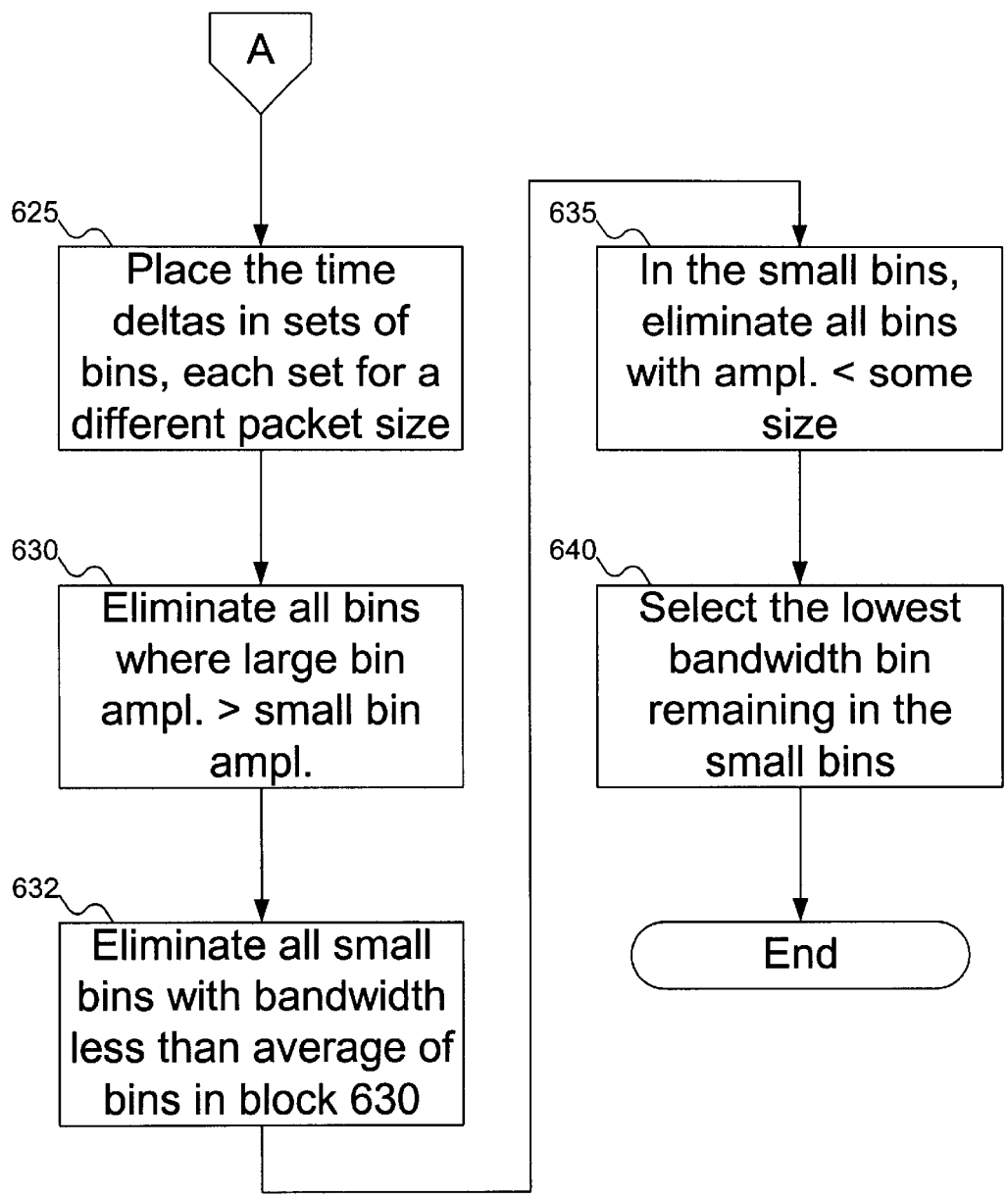

FIGS. 6A–6B show a flowchart of the procedure for using sets of packet pairs to determine the bandwidth of the network of FIG. 1, according to an embodiment of the invention. In FIG. 6A, at block 605, packet pairs are generated, each set of packet pairs centered around a packet size. At block 610, the sets of packet pairs are sent across the network from the source computer to the destination computer. At block 615, the destination computer receives the sets of packet pairs, and at block 620, the destination computer calculates a time delta for each packet pair.

At block 625 (FIG. 6B), the time deltas are placed in bins, with the time deltas from each set placed in different bins. At block 630, the sets of bins are compared, and any bins in the set associated with the smaller packet size are eliminated if the corresponding bins in the set associated with the larger packet size have a greater amplitude. At block 632, the average bandwidth of the bins eliminated in block 630 is determined, and all bins associated with the smaller packet size that have bandwidths less than the average bandwidth are eliminated. At block 635, the bin with the highest remaining amplitude associated with the small packet size is selected, and all bins associated with the small packet size that have an amplitude less than a threshold size (e.g., 30% of the highest remaining bin) are eliminated. Finally, at block 640, the bin with the lowest remaining bandwidth associated with the small packet size is selected as the network bandwidth.

Figure 7A:
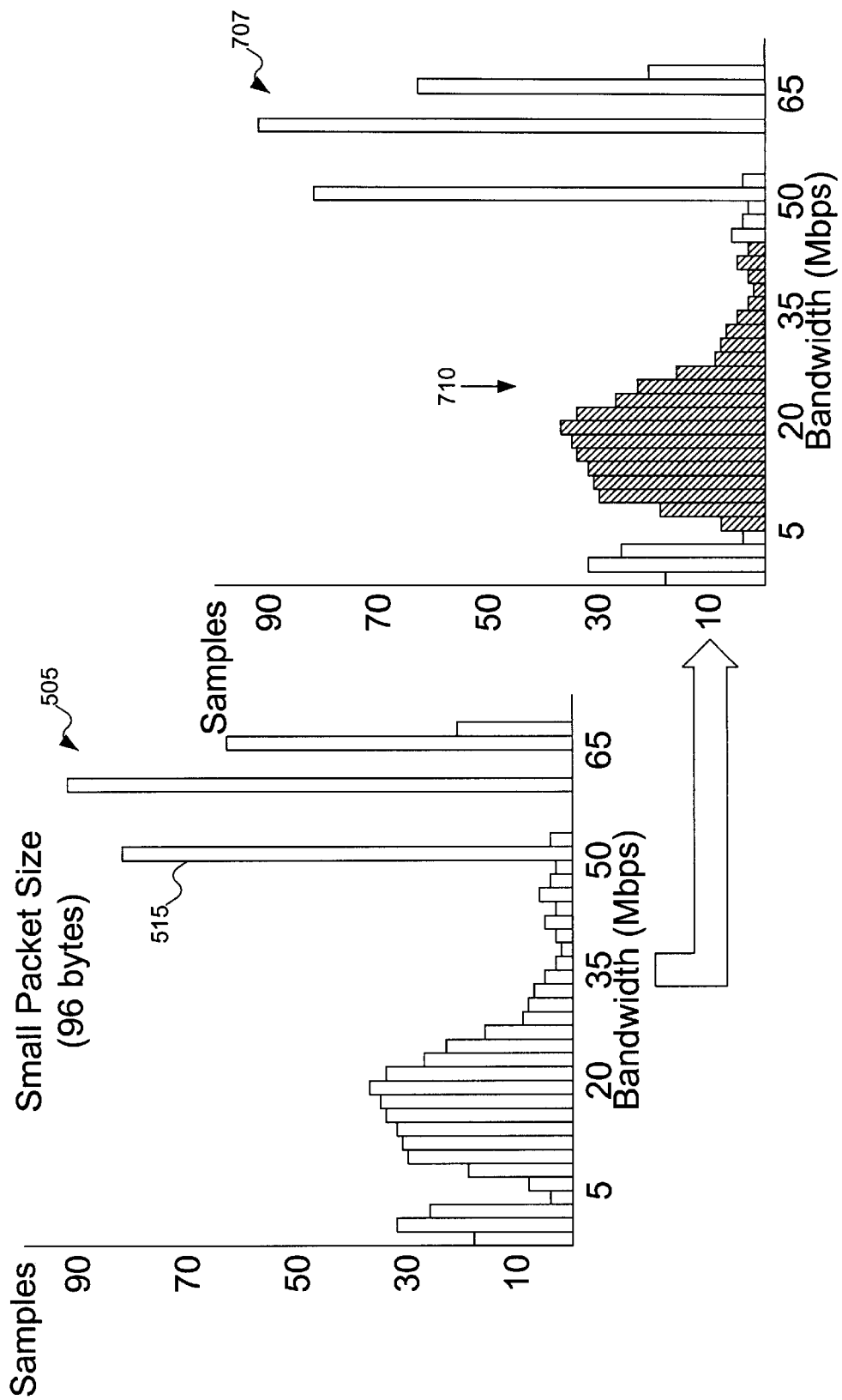
FIGS. 7A–7C show an application of the procedure of FIGS. 6A–6B to the histograms FIG. 5, according to an embodiment of the invention.
Figure 7B:
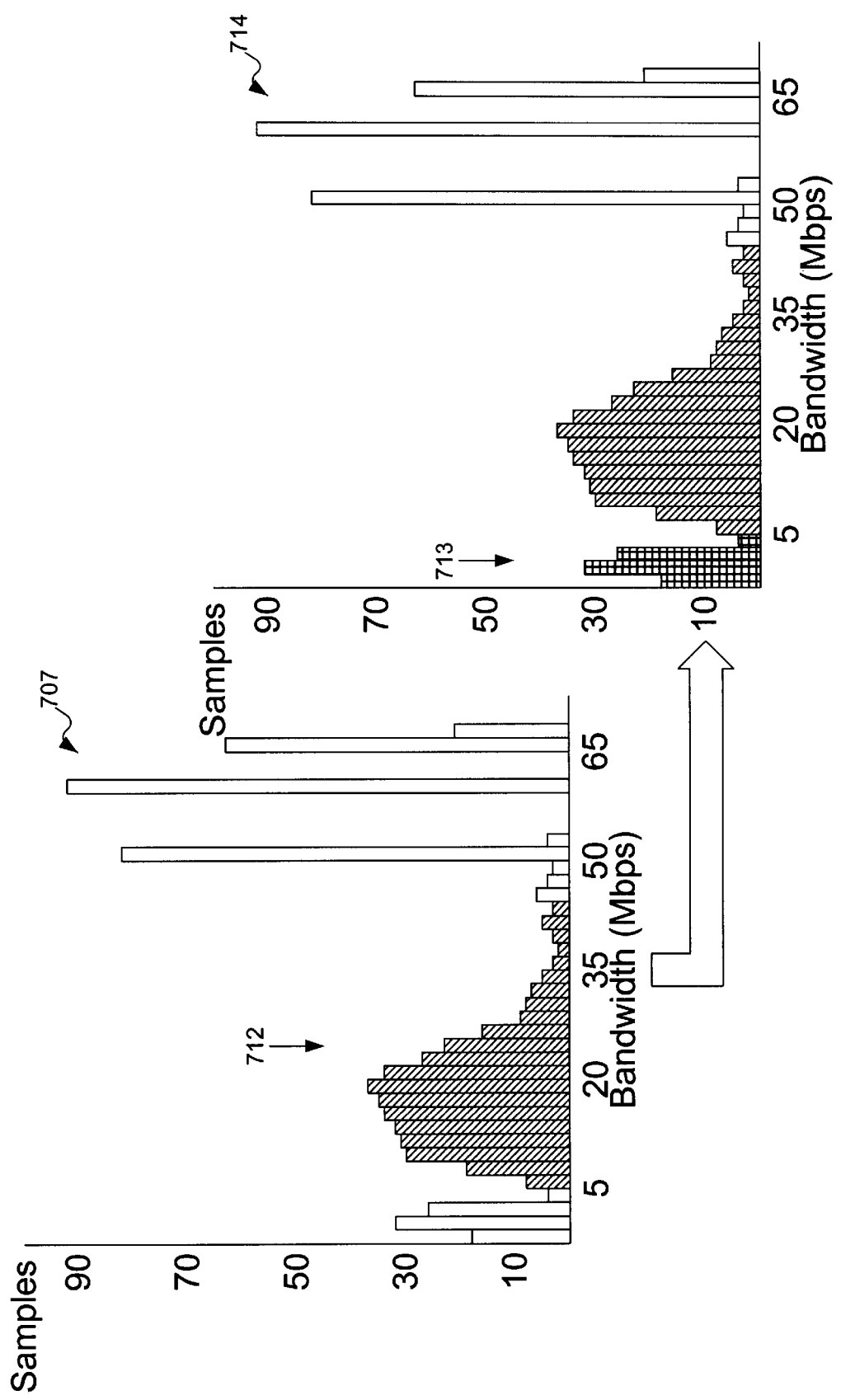
Figure 7C:
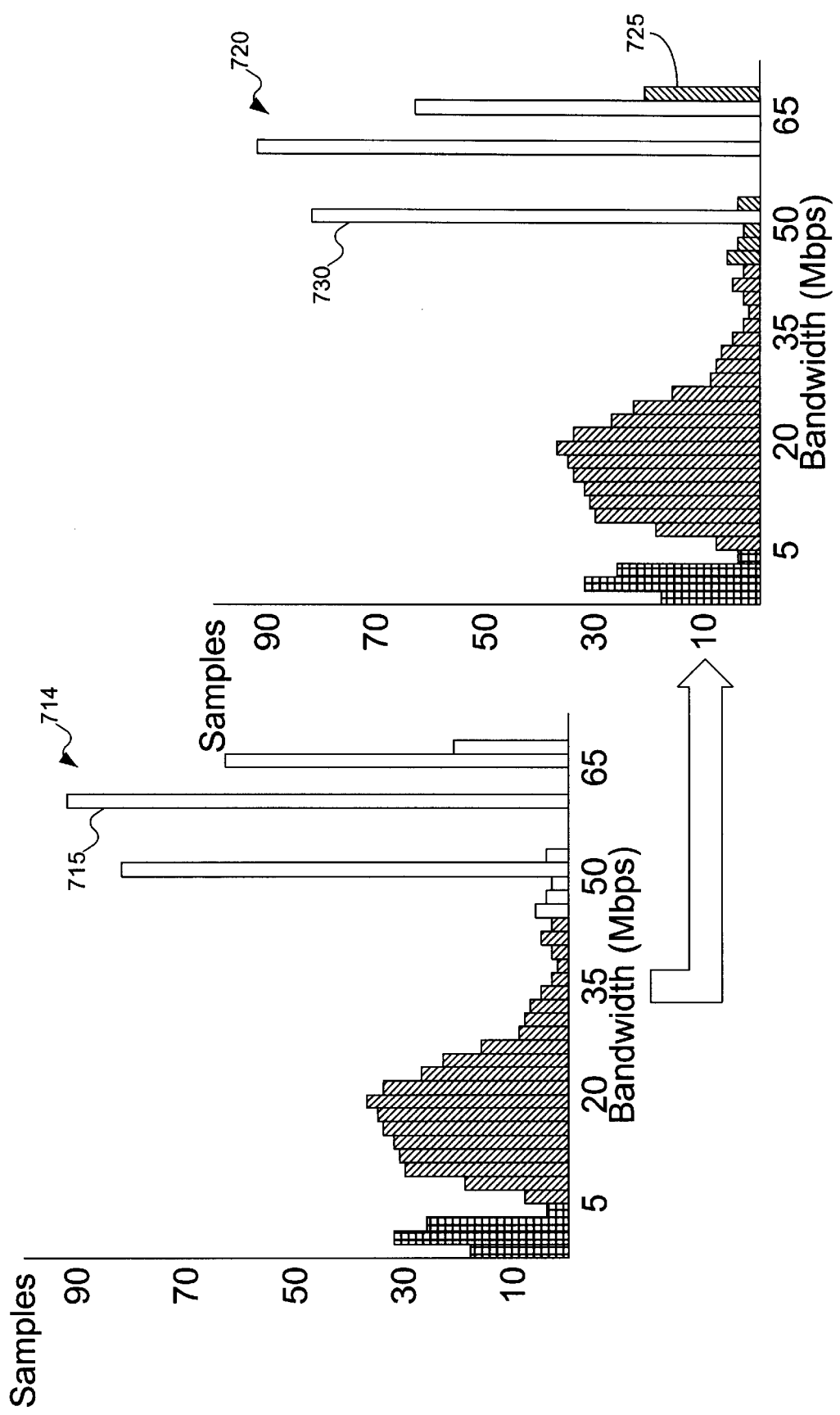

FIGS. 7A–7C show an application of the procedure of FIGS. 6A–6B to the histograms FIG. 5, according to an embodiment of the invention. In FIG. 7A, graph 505 is reproduced from FIG. 5, and shows the bins associated with the small packet size. The bins that are smaller in amplitude than the corresponding bins associated with the large packet size are eliminated. This corresponds to block 630 of FIG. 6B. In graph 707, these bins are shown as bins 710 that are left-hashed.

In FIG. 7B, graph 707 is reproduced. Applying block 632 of FIG. 6B, the average of the bins eliminated at block 630 is determined. All bins in the associated with the small packet size that have bandwidths less than the average bandwidth of the bins eliminated in block 630 are then eliminated. For example, average bandwidth 712 is determined, and bins 713 are eliminated because they have bandwidths less than average bandwidth 712, as shown in graph 714.

In FIG. 7C, graph 714 is reproduced. Applying block 635 of FIG. 6B, the largest remaining bin is determined, which is the third bin from the right (bin 715). A threshold amplitude is selected based on the amplitude of bin 715: for example, 30%. All bins that are smaller than this amplitude are eliminated. These include the four bins surrounding the bin at 50 Mbps and the bin at the far right. In graph 720, the bins (for example, bin 725) are shown as right-hashed.

Finally, applying block 640 of FIG. 6B, the bin with the lowest bandwidth remaining is selected. This is bin 730, and the network bandwidth is determined to be 50 Mbps.

Some explanation as to why this procedure is used is in order. By using packet pairs instead of packet trains, the effects of queueing and squeezing are minimized: fewer packets equal fewer chances for packet delay. By using a large number of packet pairs, individual packet queueing delays are averaged out: statistically, a reasonable percentage of packets will traverse the network without being queued. And by using two different packet sizes, "low" bandwidth bins may be eliminated, since larger packets are more likely to be queued relative to smaller packets.

A person skilled in the art will recognize that an embodiment of the invention described above may be implemented using a computer. In that case, the method is embodied as instructions that comprise a program. The program may be stored on computer-readable readable media, such as floppy disks, optical disks (such as compact discs), or fixed disks (such as hard drives). The program may then be executed on a computer to implement the method. A person skilled in the art will also recognize that an embodiment of the invention described above may include a computer-readable modulated carrier signal, and that the program, or portions of its execution, may be distributed over multiple computers in a network.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

What is claimed is:

1. An apparatus to measure network bandwidth over a network, comprising:
    a first computer, coupled to the network;
    a packet receiver installed in the first computer, the packet receiver operative to receive at least two sets of packet pairs, each set of packet pairs centered around a different packet size; and
    a timer installed in the first computer, the timer operative to determine a time delta for a packet pair received by the packet receiver.

2. An apparatus according to claim 1, wherein:
    the first set of packet pairs includes a plurality of packet pairs centered around a first packet size; and
    the second set of packet pairs includes a plurality of packet pairs centered around a second packet size.

3. An apparatus according to claim 2, wherein:
    the first packet size is 512 bytes; and
    the second packet size is 96 bytes.

4. An apparatus according to claim 1, wherein the timer includes a packet classifier.

5. An apparatus according to claim 4, wherein the packet classifier includes a kernel level packet classifier.

6. An apparatus according to claim 4, wherein the packet classifier is operative to achieve a nanosecond resolution.

7. An apparatus according to claim 1, further comprising:
    a second computer, coupled to the network; and
    a packet generator installed in the second computer, the packet generator operative to generate the two sets of packet pairs.

8. An apparatus according to claim 1, further comprising first and second sets of bins, each bin representing a possible bandwidth for the network, the first and second sets of bins including at least two bins each.

9. A method for measuring network path bandwidth, comprising:
    receiving at least first and second sets of packet pairs across a network, each set including a plurality of packet pairs;
    determining a time delta for each packet pair in the first and second sets; and
    organizing the time deltas for the packet pairs in the first and second sets into first and second sets of bins, respectively, each bin representing a possible bandwidth for the network, the first and second sets of bins including at least two bins each.

10. A method according to claim 9, further comprising:
    generating the first set of packet pairs, the first set of packet pairs centered around a first packet size; and
    generating the second set of packet pairs, the second set of packet pairs centered around a second packet size.

11. A method according to claim 10, wherein the first packet size is 512 bytes and the second packet size is 96 bytes.

12. A method according to claim 10, further comprising selecting the first and second packet sizes to avoid packet fragmentation.

13. A method according to claim 10, wherein:
    generating the first set of packet pairs includes generating packet pairs of first different packet sizes, the first different packet sizes centered around the first packet size; and
    generating the second set of packet pairs includes generating packet pairs of second different packet sizes, the second different packet sizes centered around the second packet size.

14. A method according to claim 9, wherein determining a time delta includes using a packet classifier to determine the time delta between a first packet and a second packet in the packet pair.

15. A method according to claim 14, wherein using a packet classifier includes using the packet classifier with a nanosecond resolution to determine the time delta between the first packet and the second packet in the packet pair.

16. A method according to claim 15, wherein using a packet classifier includes using a kernel level packet classifier with a nanosecond resolution to determine the time delta between the first packet and the second packet in the packet pair.

17. A method according to claim 9, wherein receiving at least first and second sets of packet pairs includes:
    generating the packet pairs in the first and second sets at a source computer; and
    sending the packet pairs in the first and second sets from the source computer to a destination computer.

18. An article comprising a machine-accessible medium having associated data that, when accessed, results in a machine:
    receiving at least first and second sets of packet pairs across a network, each set including a plurality of packet pairs;
    determining a time delta for each packet pair in the first and second sets; and organizing the time deltas for the packet pairs in the first and second sets into first and second sets of bins, respectively, each bin representing a possible bandwidth for the network, the first and second sets of bins including at least two bins each.

19. An article according to claim 18, the machine-accessible medium having further associated data that, when accessed, results in the machine:
generating the first set of packet pairs, the first set of packet pairs centered around a first packet size; and
generating the second set of packet pairs, the second set of packet pairs centered around a second packet size.

20. An article according to claim 19, wherein:
the associated data for generating the first set of packet pairs includes associated data for generating the first packet size at 512 bytes; and
the associated data for generating the first set of packet pairs includes associated data for generating the second packet size is 96 bytes.

21. An article according to claim 19, the machine-accessible medium having further associated data that, when accessed, results in the machine selecting the first and second packet sizes to avoid packet fragmentation.

22. An article according to claim 19, wherein:
the associated data for generating the first set of packet pairs includes associated data for generating packet pairs of first different packet sizes, the first different packet sizes centered around the first packet size; and
the associated data for generating the second set of packet pairs includes associated data for generating packet pairs of second different packet sizes, the second different packet sizes centered around the second packet size.

23. An article according to claim 18, wherein the associated data for determining a time delta includes associated data for using a packet classifier to determine the time delta between a first packet and a second packet in the packet pair.

24. An article according to claim 18, wherein the associated data for receiving at least first and second sets of packet pairs includes associated data for:
generating the packet pairs in the first and second sets at a source computer; and
sending the packet pairs in the first and second sets from the source computer to a destination computer.

25. A method for measuring network path bandwidth, comprising:
receiving at least first and second sets of packet pairs across a network, each set including a plurality of packet pairs;
determining a time delta for each packet pair in the first and second sets;
organizing the time deltas for the packet pairs in the first and second sets into first and second sets of bins, respectively, each bin representing a possible bandwidth for the network, the first and second sets of bins including at least two bins each; and
eliminating a second bin from the second set of bins if a first amplitude of a first bin in the first set of bins is greater than a second amplitude of the second bin in the second set of bins and the first packet size is greater than the second packet size.

26. A method according to claim 25, further comprising eliminating a third bin from the second set of bins if a bandwidth associated with the third bin is less than an average bandwidth associated with the eliminated bin.

27. A method for measuring network path bandwidth, comprising:
receiving at least first and second sets of packet pairs across a network, each set including a plurality of packet pairs;
determining a time delta for each packet pair in the first and second sets;
organizing the time deltas for the packet pairs in the first and second sets into first and second sets of bins, respectively, each bin representing a possible bandwidth for the network, the first and second sets of bins including at least two bins each;
determining a maximum amplitude for a bin in the second set of bins; and
eliminating a bin in the second set of bins with an amplitude sufficiently smaller than the maximum amplitude.

28. A method according to claim 27, wherein eliminating a bin includes eliminating the bin if the amplitude is less than roughly 30% of the maximum amplitude.

29. A method for measuring network path bandwidth, comprising:
receiving at least first and second sets of packet pairs across a network, each set including a plurality of packet pairs;
determining a time delta for each packet pair in the first and second sets;
organizing the time deltas for the packet pairs in the first and second sets into first and second sets of bins, respectively, each bin representing a possible bandwidth for the network, the first and second sets of bins including at least two bins each; and
selecting as the bandwidth of the network a lowest bandwidth associated with a bin in the second set of bins containing a time delta.

30. A method for measuring network path bandwidth, comprising:
receiving at least first and second sets of packet pairs across a network, each set including a plurality of packet pairs;
determining a time delta for each packet pair in the first and second sets;
organizing the time deltas for the packet pairs in the first and second sets into first and second sets of bins, respectively, each bin representing a possible bandwidth for the network, the first and second sets of bins including at least two bins each;
eliminating a bin from second set of bins if a first amplitude of a first bin in the first set of bins is greater than a second amplitude of a second bin in the second set of bins and the first packet size is greater than the second packet size;
determining a maximum amplitude for a bin in the second set of bins;
eliminating a bin in the second set of bins with an amplitude sufficiently smaller than the maximum amplitude; and
selecting as the bandwidth of the network a lowest bandwidth associated with a bin in the second set of bins containing a time delta.

31. An article comprising a machine-accessible medium having associated data that, when accessed, results in a machine:
receiving at least first and second sets of packet pairs across a network, each set including a plurality of packet pairs;

determining a time delta for each packet pair in the first and second sets;

organizing the time deltas for the packet pairs in the first and second sets into first and second sets of bins, respectively, each bin representing a possible bandwidth for the network, the first and second sets of bins including at least two bins each; and eliminating a second bin from the second set of bins if a first amplitude of a first bin in the first set of bins is greater than a second amplitude of the second bin in the second set of bins and the first packet size is greater than the second packet size.

32. An article according to claim 31, the machine-accessible medium having further associated data that, when accessed, results in the machine 33. An article comprising a machine-accessible medium having associated data that, when accessed, results in a machine:

receiving at least first and second sets of packet pairs across a network, each set including a plurality of packet pairs;

determining a time delta for each packet pair in the first and second sets;

organizing the time deltas for the packet pairs in the first and second sets into first and second sets of bins, respectively, each bin representing a possible bandwidth for the network, the first and second sets of bins including at least two bins each;

determining a maximum amplitude for a bin in the second set of bins; and eliminating a bin in the second set of bins with an amplitude sufficiently smaller than the maximum amplitude.

34. An article according to claim 33, wherein the associated data for eliminating a bin includes associated data for eliminating the bin if the amplitude is less than roughly 30% of the maximum amplitude.

35. An article comprising a machine-accessible medium having associated data that, when accessed, results in a machine:

receiving at least first and second sets of packet pairs across a network, each set including a plurality of packet pairs;

determining a time delta for each packet pair in the first and second sets;

organizing the time deltas for the packet pairs in the first and second sets into first and second sets of bins, respectively, each bin representing a possible bandwidth for the network, the first and second sets of bins including at least two bins each; and selecting as the bandwidth of the network a lowest bandwidth associated with a bin in the second set of bins containing a time delta.

36. An article comprising a machine-accessible medium having associated data that, when accessed, results in a machine:

receiving at least first and second sets of packet pairs across a network, each set including a plurality of packet pairs;

determining a time delta for each packet pair in the first and second sets;

organizing the time deltas for the packet pairs in the first and second sets into first and second sets of bins, respectively, each bin representing a possible bandwidth for the network, the first and second sets of bins including at least two bins each;

eliminating a bin from second set of bins if a first amplitude of a first bin in the first set of bins is greater than a second amplitude of a second bin in the second set of bins and the first packet size is greater than the second packet size;

determining a maximum amplitude for a bin in the second set of bins;

eliminating a bin in the second set of bins with an amplitude sufficiently smaller than the maximum amplitude; and selecting as the bandwidth of the network a lowest bandwidth associated with a bin in the second set of bins containing a time delta.

37. An article comprising a machine-accessible medium having associated data that, when accessed, results in a machine:

receiving at least first and second sets of packet pairs across a network, each set including a plurality of packet pairs;

determining a time delta for each packet pair in the first and second sets using a packet classifier with a nanosecond resolution; and organizing the time deltas for the packet pairs in the first and second sets into first and second sets of bins, respectively, each bin representing a possible bandwidth for the network, the first and second sets of bins including at least two bins each.

38. An article according to claim 37, wherein the associated data for using a packet classifier includes associated data for using a kernel level packet classifier with a nanosecond resolution to determine the time delta between the first packet and the second packet in the packet pair.

* * * * *

UNITED STATES PATENT AND TRADEMARK OFFICE
CERTIFICATE OF CORRECTION

PATENT NO. : 6,850,541 B2  Page 1 of 1
DATED : February 1, 2005
INVENTOR(S) : Gross It is certified that error appears in the above-identified patent and that said Letters Patent is hereby corrected as shown below:

Column 9,
Line 16, replace "results in the machine" with -- results in the machine eliminating a third bin from the second set of bins if a bandwidth associated with the third bin is less than an average bandwidth associated with the eliminated bin. --.

Signed and Sealed this

Fourth Day of April, 2006

JON W. DUDAS
*Director of the United States Patent and Trademark Office*